(12) United States Patent
Eastham

(10) Patent No.: US 8,271,657 B2
(45) Date of Patent: Sep. 18, 2012

(54) SYSTEMS AND METHODS FOR SELECTING A TRANSPORT MECHANISM FOR COMMUNICATION IN A NETWORK

(75) Inventor: Bryant Eastham, Draper, UT (US)

(73) Assignee: Panasonic Corporation, Osaka (JP)

( * ) Notice: Subject to any disclaimer, the term of this patent is extended or adjusted under 35 U.S.C. 154(b) by 1185 days.

(21) Appl. No.: 11/305,831

(22) Filed: Dec. 16, 2005

(65) Prior Publication Data

US 2007/0140243 A1  Jun. 21, 2007

(51) Int. Cl.
G06F 15/16 (2006.01)

(52) U.S. Cl. ........ 709/227; 709/228; 709/229; 709/230; 709/238; 370/389; 370/390; 370/391; 370/392; 370/432

(58) Field of Classification Search .................. 709/230, 709/238; 370/432
See application file for complete search history.

(56) References Cited

U.S. PATENT DOCUMENTS

| | | | |
|---|---|---|---|
| 6,336,119 B1* | 1/2002 | Banavar et al. ...................... 1/1 |
| 6,385,198 B1* | 5/2002 | Ofek et al. ..................... 370/389 |
| 6,501,957 B2* | 12/2002 | Muhonen et al. ............. 455/503 |
| 6,816,901 B1* | 11/2004 | Sitaraman et al. ............ 709/225 |
| 6,989,757 B2* | 1/2006 | Geoffrey et al. .............. 340/632 |
| 6,999,421 B1* | 2/2006 | Holzworth et al. ........... 370/235 |
| 7,103,054 B2* | 9/2006 | Novaes .......................... 370/401 |
| 7,130,402 B2* | 10/2006 | Kawaguchi et al. .......... 379/196 |
| 7,415,026 B2* | 8/2008 | Hsu et al. ................... 370/395.3 |
| 7,664,856 B2* | 2/2010 | Bowra et al. .................. 709/225 |
| 7,786,891 B2* | 8/2010 | Owens et al. ................. 340/541 |
| 7,796,517 B2* | 9/2010 | Chen et al. .................... 370/235 |
| 7,881,280 B2* | 2/2011 | Pennock et al. .............. 370/351 |
| 7,974,223 B2* | 7/2011 | Zelig et al. .................... 370/258 |
| 8,050,281 B2* | 11/2011 | Casey et al. ................... 370/401 |
| 2002/0065915 A1* | 5/2002 | Anderson et al. ............. 709/225 |
| 2002/0191610 A1* | 12/2002 | Baek et al. .................... 370/390 |
| 2004/0015591 A1* | 1/2004 | Wang ............................ 709/228 |
| 2004/0105445 A1* | 6/2004 | Wyn-Harris et al. .... 370/395.21 |

(Continued)

FOREIGN PATENT DOCUMENTS

WO 01/99370 12/2001

OTHER PUBLICATIONS

Sakate, Hiroharu et al., Resource Mangement for Quality of Service Guarantees in Multi-party Multimedia Application, pp. 1-8.*

(Continued)

*Primary Examiner* — Backhean Tiv

(74) *Attorney, Agent, or Firm* — Austin Rapp & Hardman

(57) ABSTRACT

A publisher node in a network determines how many subscriber nodes in the network have subscribed to receive notification messages about data that is maintained by the publisher node. The publisher node also determines how many available connections the publisher node is configured to support. If the number of available connections exceeds the number of subscribers, the publisher node sends the notification messages to the subscriber nodes via a connection-based protocol. If the number of subscriber nodes exceeds the number of available connections, the publisher node sends the notification messages to the subscriber nodes via multicast. If the publisher node sends the notification messages to the subscriber nodes via multicast, the publisher node may receive one or more connection requests from subscribers that may be depending on reliably receiving the notification messages from the publisher.

20 Claims, 10 Drawing Sheets

U.S. PATENT DOCUMENTS

| | | | |
|---|---|---|---|
| 2004/0128397 A1* | 7/2004 | Glasmann et al. | 709/232 |
| 2005/0086469 A1* | 4/2005 | Dunagan et al. | 713/163 |
| 2005/0204042 A1* | 9/2005 | Banerjee et al. | 709/226 |
| 2005/0213525 A1* | 9/2005 | Grayson et al. | 370/312 |
| 2006/0018335 A1* | 1/2006 | Koch et al. | 370/432 |
| 2006/0023663 A1* | 2/2006 | Kim et al. | 370/329 |
| 2006/0155801 A1* | 7/2006 | Brabson | 709/201 |
| 2007/0140243 A1* | 6/2007 | Eastham | 370/390 |
| 2008/0239963 A1* | 10/2008 | Brabson | 370/235 |
| 2008/0250110 A1* | 10/2008 | Zhao | 709/206 |
| 2009/0024746 A1* | 1/2009 | Welch | 709/228 |
| 2012/0013451 A1* | 1/2012 | Casey et al. | 340/286.02 |

OTHER PUBLICATIONS

Crawley, E et al., A Framework for QOS-based Routing in the Internet, RFC 2386, Aug. 1998, pp. 1-32.*
Wikipedia, Quality of Service, pp. 1-9.*

* cited by examiner

Subscriber *604*

Multicast Protocol Stack *616*

Connection-Based Protocol Stack *618*

QOS Evaluation *628*

QOS Parameter *630*

FIG. 6

SYSTEMS AND METHODS FOR SELECTING A TRANSPORT MECHANISM FOR COMMUNICATION IN A NETWORK

TECHNICAL FIELD

The present invention relates generally to computers and computer-related technology. More specifically, the present invention relates to systems and methods for selecting a transport mechanism for communication in a network.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc. As used herein, the term "computer network" (or simply "network") refers to any system in which a series of nodes are interconnected by a communications path. The term "node" refers to any device that may be connected as part of a computer network. An embedded system may be a network node. Other examples of network nodes include computers, personal digital assistants (PDAs), cell phones, etc.

Some embedded systems may provide data and/or services to other computing devices using a computer network. Many different kinds of services may be provided. Some examples of services include providing temperature data from a location, providing surveillance data, providing weather information, providing an audio stream, providing a video stream, etc.

Nodes may be interconnected so as to form a peer-to-peer network. A peer-to-peer computer network is a network that relies on the computing power and bandwidth of the participants in the network rather than concentrating it in a relatively few number of servers. Peer-to-peer networks are typically used for connecting nodes via largely ad hoc connections.

Nodes within a computer network may be configured to send messages to other nodes via a connection-based protocol, such as TCP/IP. Connection-based protocols may provide reliable delivery of packets from sender to receiver. Accordingly, if a connection-based protocol is used to send messages to network nodes, it is generally possible to achieve a high quality of service.

As an alternative to sending messages via a connection-based protocol, at least some nodes may be configured to send messages to other network nodes using multicast technology. Within the context of computer networks, the term "multicasting" refers to the process of sending a message simultaneously to more than one node on the network. Multicasting is different from broadcasting in that multicasting means sending a message to specific groups of nodes within a network, whereas broadcasting implies sending a message to all of the nodes on the network.

Under some circumstances, it may be preferable to send messages to other network nodes via a connection-based protocol. However, under other circumstances, it may be preferable to send messages to other network nodes via multicast. Benefits may be realized by improvements related to the way in which nodes select an appropriate transport mechanism (i.e., either a connection-based protocol or multicast) for communication in a network, such as a peer-to-peer network.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 6 is a block diagram that illustrates various functional components within a subscriber according to an embodiment;

DETAILED DESCRIPTION

Figure 1:
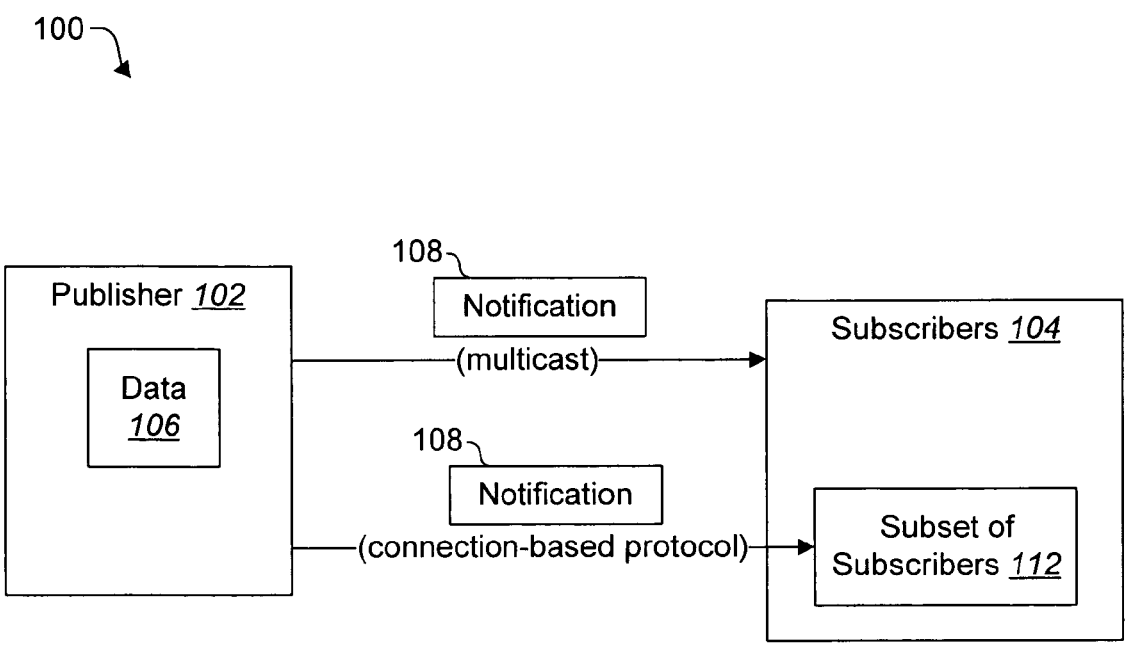
FIG. 1 is a block diagram that illustrates a system for selecting an appropriate transport mechanism for communication between nodes in a computer network according to an embodiment.

Systems and methods for selecting a transport mechanism for communication in a network, such as a peer-to-peer network, are disclosed. In an exemplary embodiment, a publisher node in a network determines how many subscriber nodes in the network have subscribed to receive notification messages about data that is maintained by the publisher node. The publisher node also determines how many available connections the publisher node is configured to support. If the number of available connections exceeds the number of subscribers, the publisher node sends the notification messages to the subscriber nodes via a connection-based protocol (e.g., TCP/IP). If the number of subscriber nodes exceeds the number of available connections, the publisher node sends the notification messages to the subscriber nodes via multicast.

If the publisher node sends the notification messages to the subscriber nodes via multicast, the publisher node may receive one or more connection requests from subscribers that may be depending on reliably receiving the notification messages from the publisher. When the publisher node receives a connection request from a subscriber node, the publisher node may determine whether it is configured to support at least one additional connection. If it is, the publisher node may accept the connection request. If the publisher node is not configured to support at least one additional connection, the publisher node may determine whether the requesting subscriber node's quality of service requirement is greater than at least one presently connected subscriber node's quality of service requirement. If it is, the publisher node may terminate a current connection of a subscriber node that has a lower quality of service requirement than the requesting subscriber node, and open a connection to the requesting subscriber node.

If the publisher node is sending notification messages via a connection-based protocol, at some point the number of subscriber nodes that request connections to the publisher node may exceed the number of available connections. If this occurs, the publisher node may switch from sending the notification messages via the connection-based protocol to sending the notification messages via multicast.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram that illustrates a system 100 for selecting an appropriate transport mechanism for communication between nodes in a computer network according to an embodiment. At least some of the nodes in the network may have data that is of interest to other nodes in the network. For example, the network may include a temperature sensor, and at least some other nodes in the network may be interested in being notified about the current temperature that is detected by the temperature sensor. As another example, the network may include a door sensor, and one or more other nodes in the network (e.g., an alarm system) may be interested in being notified about whether the door is open or closed.

The data may be tagged with an identifier and a location. A node in the network may subscribe to data on a given identifier, and may receive notification messages about data that shares its location. For example, suppose that node A is in locations L1 and L2, and that node B is in locations L2 and L3. If node B publishes data D1 and node A subscribes to data D1, then node A receives updates to D1.

As used herein, the term "publisher node" (or simply "publisher") refers to a node that sends notification messages about data to one or more other nodes in the network. The term "subscriber node" (or simply "subscriber") refers to a node that receives notification messages about data from a publisher. The system 100 that is shown in FIG. 1 includes a publisher 102. The publisher 102 has data 106 for which there are several subscribers 104. The publisher 102 sends notification messages 108 about the data 106 to the subscribers 104.

The publisher 102 may send the notification messages 108 to the subscribers 104 via a connection-based protocol, such as TCP/IP. Advantageously, connection-based protocols may provide reliable delivery of packets from sender to receiver. Accordingly, if a connection-based protocol is used, it is generally possible to achieve a high quality of service. However, one disadvantage with connection-based protocols is that there may be a limited number of connections that a publisher 102 is capable of supporting. If the data 106 is relevant to many nodes within the network and there are many subscribers 104 for notification messages 108 about the data 106, it may be difficult for the publisher 102 to support connections to all of the subscribers 104.

As an alternative to a connection-based protocol, the publisher 102 may send the notification messages 108 to the subscribers 104 via multicast. Advantageously, if multicast is used it may be possible to send notification messages 108 to a larger number of subscribers 104 than if a connection-based protocol were used. However, one disadvantage of multicasting is that it is not always completely reliable. Notification messages 108 that are sent via multicast may become lost during transmission and sometimes may not be delivered to at least some of the subscribers 104. While this may not be a problem for some subscribers 104, for other subscribers 104 it may be very important to receive each notification message 108 that is sent. For example, it may be very important for an alarm system to be notified whenever a door sensor detects a door being opened. If it is very important for a subscriber 104 to receive each notification message 108 that is sent, then it is generally preferable for the subscriber 104 to receive the notification messages 108 via a connection-based protocol.

The system 100 shown in FIG. 1 is configured to automatically determine an appropriate transport mechanism (i.e., multicast or a connection-based protocol) between a publisher 102 and any subscribers 104 that are interested in receiving notification messages 108 about the publisher's 102 data 106. At some point (e.g., when the publisher 102 begins sending notification messages 108 to subscribers 104), the publisher 102 makes an initial determination about whether to send the notification messages 108 via multicast or via a connection-based protocol. If the publisher 102 is not capable of supporting connections to all of the subscribers 104, then the publisher 102 may send notification messages 108 via multicast. However, if the publisher 102 is capable of supporting connections to all of the subscribers 104, then the publisher 102 may choose to send notification messages 108 via a connection-based protocol.

Even if the publisher 102 begins sending notification messages 108 via multicast, one or more of the subscribers 104 may determine that multicast does not provide sufficient quality of service and may request connections from the publisher 102. If this occurs, the publisher 102 accepts as many connections as it is capable of supporting. Thus, in addition to sending notification messages 108 via multicast, the publisher 102 may also send notification messages 108 via a connection-based protocol to a subset 112 of the subscribers 104 in the network. Accordingly, it may occur that the publisher 102 may send notification messages 108 over both multicast and a connection-based protocol. If the publisher 102 receives more connection requests than it can support, then it determines which subscribers 104 receive connections based on the degree of importance which the subscribers 104 have assigned to receiving the notification messages 108 with a high quality of service. This will be discussed in greater detail below.

Figure 2:
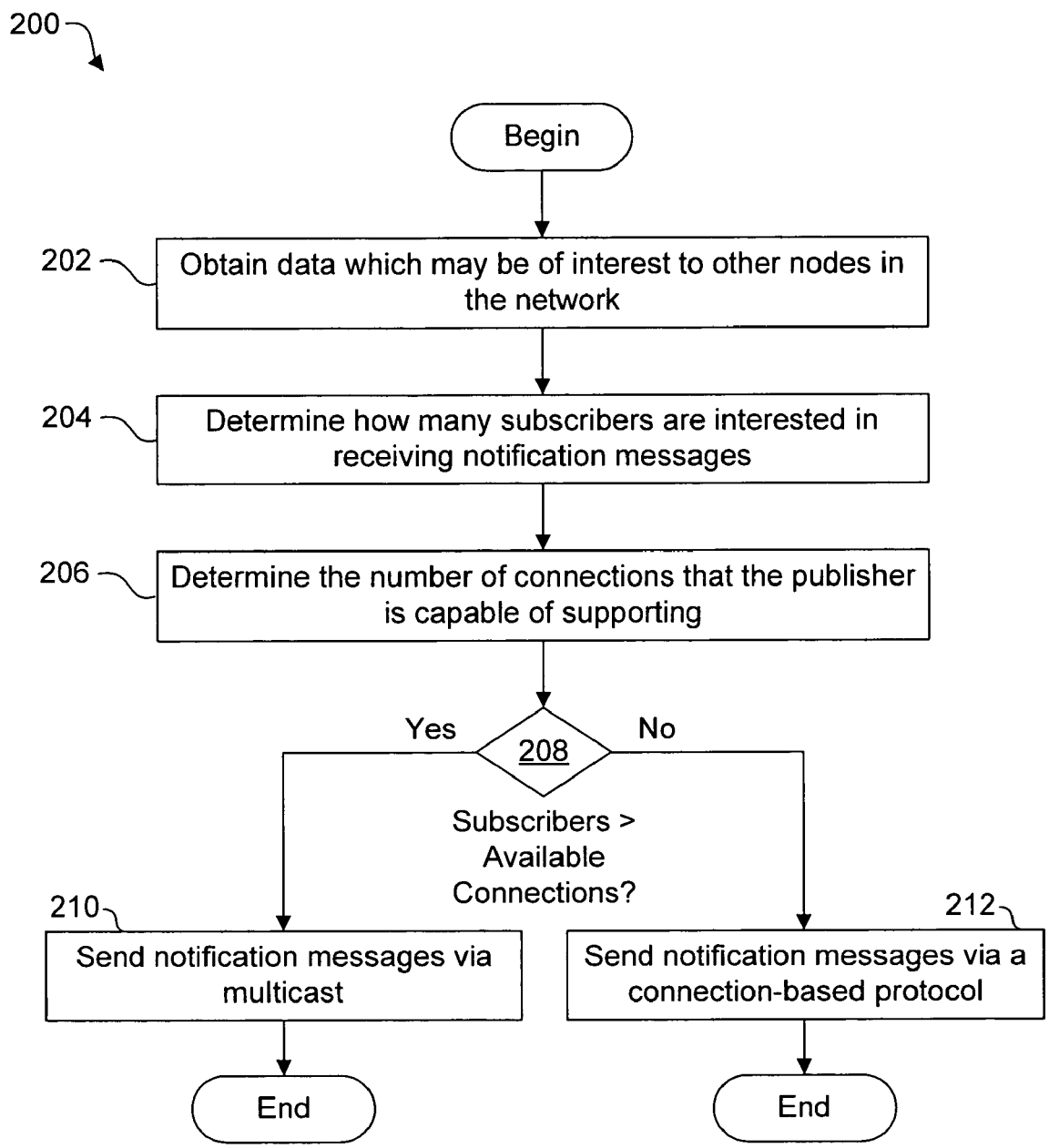
FIG. 2 is a flow diagram that illustrates how a publisher may determine whether to use a connection-based protocol or multicast to send notification messages to subscribers according to an embodiment.

FIG. 2 is a flow diagram that illustrates how a publisher 102 may determine whether to use a connection-based protocol or multicast to send notification messages 108 to subscribers 104 according to an embodiment. In accordance with the illustrated method 200, the publisher 102 obtains 202 data 106 which may be of interest to other nodes in the network.

The publisher 102 determines 204 how many subscribers 104 there are in the network that have subscribed to receive notification messages 108 about the data 106. This determination could be through a subscription protocol, where the publisher 102 notifies the potential subscribers 104 on the network about the availability of the data 106, and subscribers 104 respond indicating their interest in the data 106. Alternatively, the subscribers 104 could query the potential publishers 102 using multicast requesting a particular data 106. Using either method the publisher 102 obtains a count of the total subscribers 104 in the network. Also, in accordance with the illustrated method 200, the publisher 102 also determines 206 the number of connections that the publisher 102 is capable of supporting.

The publisher 102 compares 208 the number of subscribers 104 (as determined in step 204) to the number of available connections (as determined in step 206). If the number of subscribers 104 exceeds the number of available connections, then the publisher 102 sends 210 the notification messages 108 to the subscribers 104 via multicast. However, if the number of subscribers 104 does not exceed the number of available connections, then the publisher 102 sends 212 the notification messages 108 to the subscribers 104 via a connection-based protocol, such as TCP/IP.

As indicated above, if the publisher 102 sends 210 notification messages 108 via multicast, one or more of the subscribers 104 may determine that multicast does not provide sufficient quality of service and may request connections from the publisher 102. If this occurs, then in addition to sending notification messages 108 via multicast, the publisher 102 may also send notification messages 108 via a connection-based protocol to some of the subscribers 104 in the network.

Figure 3:
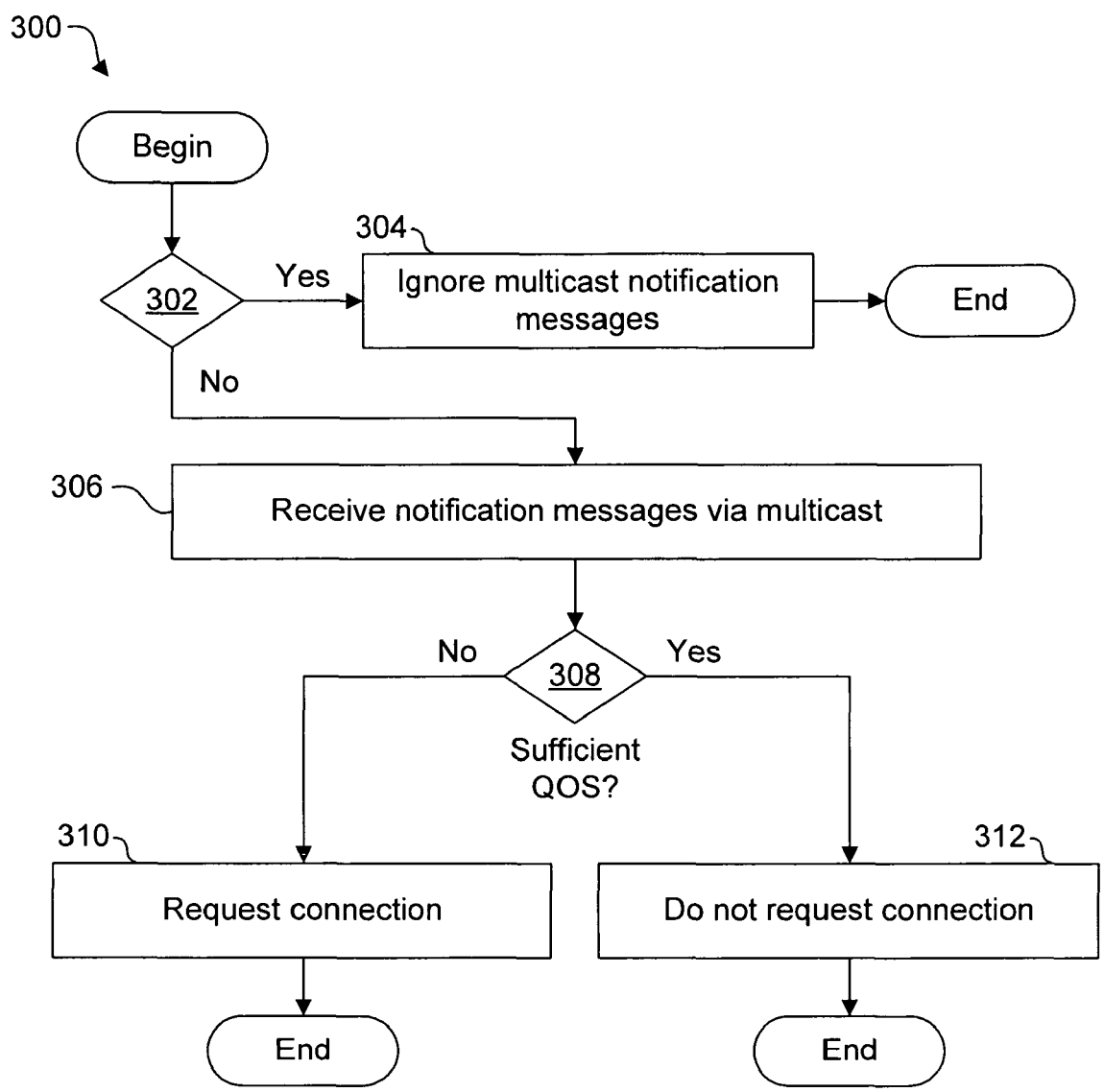
FIG. 3 is a flow diagram that illustrates the operation of a subscriber according to an embodiment when a publisher begins sending notification messages via multicast.

FIG. 3 is a flow diagram that illustrates the operation of a subscriber 104 according to an embodiment when a publisher 102 begins sending notification messages 108 via multicast. The subscriber 104 first checks 302 whether or not a connection exists for the data 106 in the notification 108. If a connection exists then the subscriber 104 ignores 304 the multicast notification messages 108. Otherwise, in response to receiving 306 notification messages 108 via multicast, the subscriber 104 determines 308 whether multicast provides sufficient quality of service. For example, if it is important for the subscriber 104 to reliably receive each notification message 108 that is sent, then the subscriber 104 may determine that multicast does not provide sufficient quality of service for its needs. However, if it is not important for the subscriber 104 to reliably receive each notification message 108 that is sent, then the subscriber 104 may determine that multicast provides sufficient quality of service for its needs.

In some embodiments, the subscriber 104 may maintain a quality of service (QOS) parameter for the data 106. The QOS parameter indicates how important it is for the subscriber 104 to reliably receive each notification message 108 that is sent. In some embodiments, the QOS parameter may have a range of values, including a maximum value and a minimum value. If the QOS parameter is set equal to its maximum value, this means that it is very important for the subscriber 104 to reliably receive each notification message 108 that is sent. Conversely, if the QOS parameter is set equal to its minimum value, this means that it is not very important for the subscriber 104 to reliably receive each notification message 108 that is sent.

To determine whether multicast provides sufficient quality of service for receiving notification messages 108 about data 106 from a publisher 102, a subscriber 104 may compare the QOS parameter for the data 106 to a threshold value. If the QOS parameter exceeds the threshold value, then multicast does not provide sufficient quality of service. However, if the QOS parameter does not exceed the threshold value, then multicast does provide sufficient quality of service. Both the QOS parameter and the threshold value may be set in advance by a user of the subscriber 104.

If the subscriber 104 determines 308 that multicast does not provide sufficient quality of service for its needs, the subscriber 104 may request 310 a connection from the publisher 102. However, if multicast does provide sufficient quality of service for its needs, then the subscriber 104 may be configured not to request 312 a connection from the publisher 102.

Figure 4:
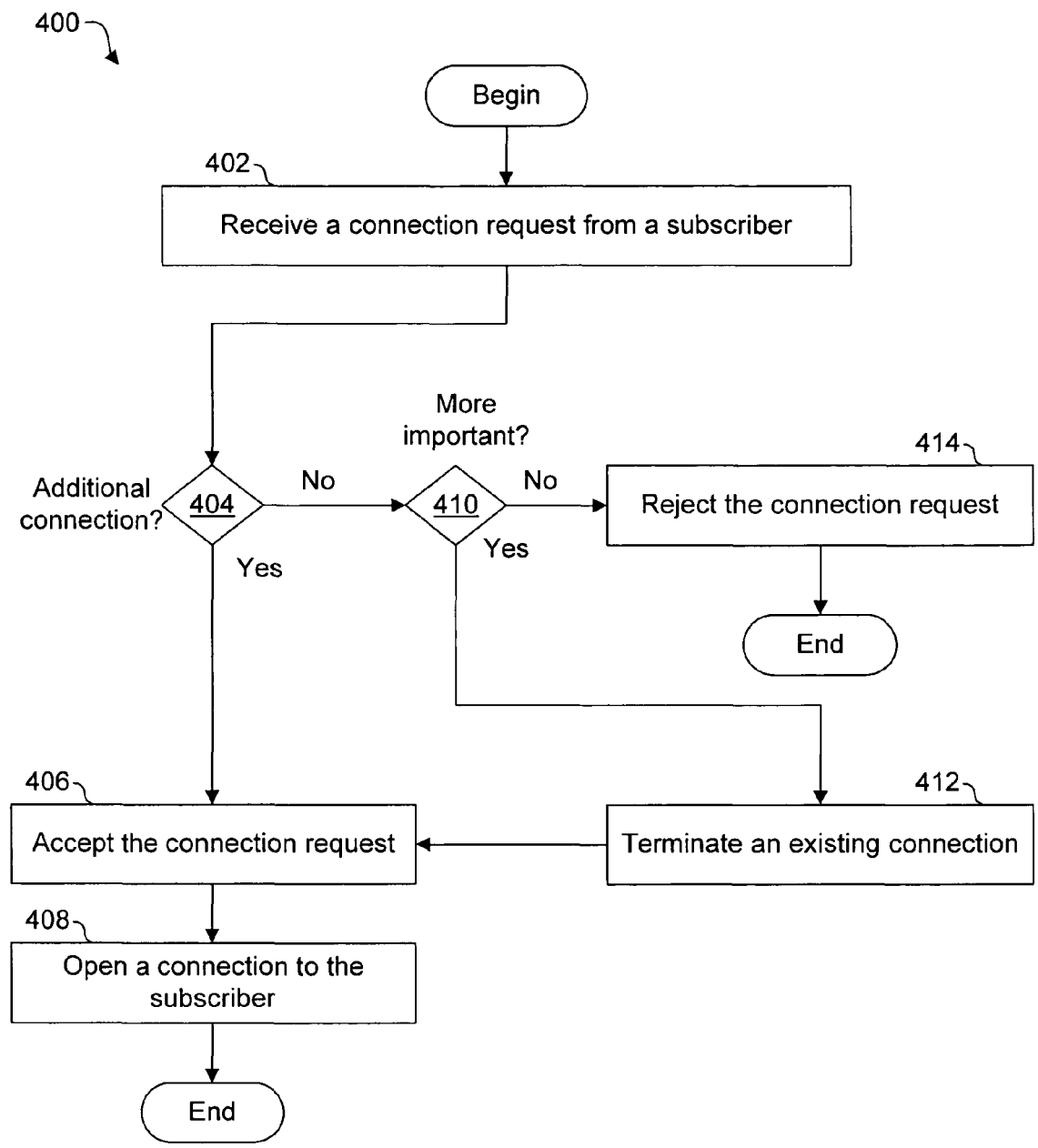
FIG. 4 is a flow diagram that illustrates the operation of a publisher according to an embodiment in response to receiving a connection request from a subscriber.

FIG. 4 is a flow diagram that illustrates the operation of a publisher 102 according to an embodiment in response to receiving 402 a connection request from a subscriber 104. When the publisher 102 receives the connection request, it may already have opened connections to one or more other subscribers 104, and it may not be capable of supporting an additional connection. In accordance with the illustrated method 400, the publisher 102 determines 404 whether it can support an additional connection.

If the publisher 102 is capable of supporting an additional connection, then the publisher 102 accepts 406 the connection request and opens 408 a connection to the subscriber 104. However, if the publisher 102 determines 404 that it is not capable of supporting an additional connection, then the publisher 102 determines 410 whether it is more important for the subscriber 104 that sent the connection request (the requesting subscriber 104) to receive a high quality of service than it is for at least one of the presently connected subscribers 104. This may involve comparing the QOS parameter of the subscriber 104 that sent the connection request to the QOS parameters of the presently connected subscribers 104.

If the publisher 102 determines 410 that it is more important for the requesting subscriber 104 to receive high quality of service than it is for at least one of the presently connected subscribers 104, then the publisher 102 terminates 412 one of the existing connections. The connection that is terminated is typically the connection to the subscriber 104 for which high quality of service is least important. For example, the publisher 102 may terminate the connection to the subscriber 104 that has the lowest QOS parameter (in embodiments where a high QOS parameter indicates that high quality of service is important). In addition to terminating 412 the connection, the publisher 102 also accepts 406 the connection request from the requesting subscriber 104 and opens 408 a connection to the requesting subscriber 104. If the subscriber 104 determines 410 that it is more important for each of the presently connected subscribers 104 to receive high quality of service than it is for the requesting subscriber 104, then the publisher 102 rejects 414 the connection request.

Several examples will now be discussed. Suppose that a publisher 102 has data 106 that many nodes are interested in (for example, the current outside temperature). As a result, there may be many subscribers 104 that want to receive notification messages 108 about the data 106. However, suppose that it is not extremely important for any of the subscribers 104 to reliably receive each notification message 108 that is sent. In this scenario, the publisher 102 may send notification messages 108 about the data 106 via multicast. If it is not very important for any of the subscribers 104 to reliably receive the notification messages 108, then it may occur that none of the subscribers 104 attempt to open connections to the publisher 102.

However, suppose there are a few subscribers 104 for which it is important to reliably receive notification messages 108. For example, where the data 106 is the current outside temperature, a display may want to be notified each time that the outside temperature changes. Where the publisher 102 is multicasting the notification messages 108 but there are a few subscribers 104 that would like to receive high quality of service, each of these subscribers 104 may discover and request a direct connection from the publisher 102.

If the number of subscribers 104 that want to receive high quality of service increases, it may occur that the publisher 102 is no longer capable of supporting connections to each of the subscribers 104. If this occurs, the publisher 102 keeps connections open to as many subscribers 104 as it can support. The publisher 102 may select the subscribers 104 for which high quality of service is most important to receive direct connections.

As another example, suppose that only a few subscribers 104 are interested in receiving notification messages 108 about a publisher's 102 data 106. If the publisher 102 is capable of supporting connections to each of the subscribers 104, it may open connections to the subscribers 104 and send notification messages 108 via a connection-based protocol. This may occur even if it is not particularly important for the subscribers 104 to receive high quality of service. If the number of subscribers 104 increases so that the publisher 102 is no longer capable of supporting connections to each of the subscribers 104, then the publisher 102 may close the connections to the subscribers 104 and may begin multicasting the notification messages 108 to the subscribers 104. Note that this may result in some of the subscribers 104 requesting connections from the publisher 102.

Figure 5:
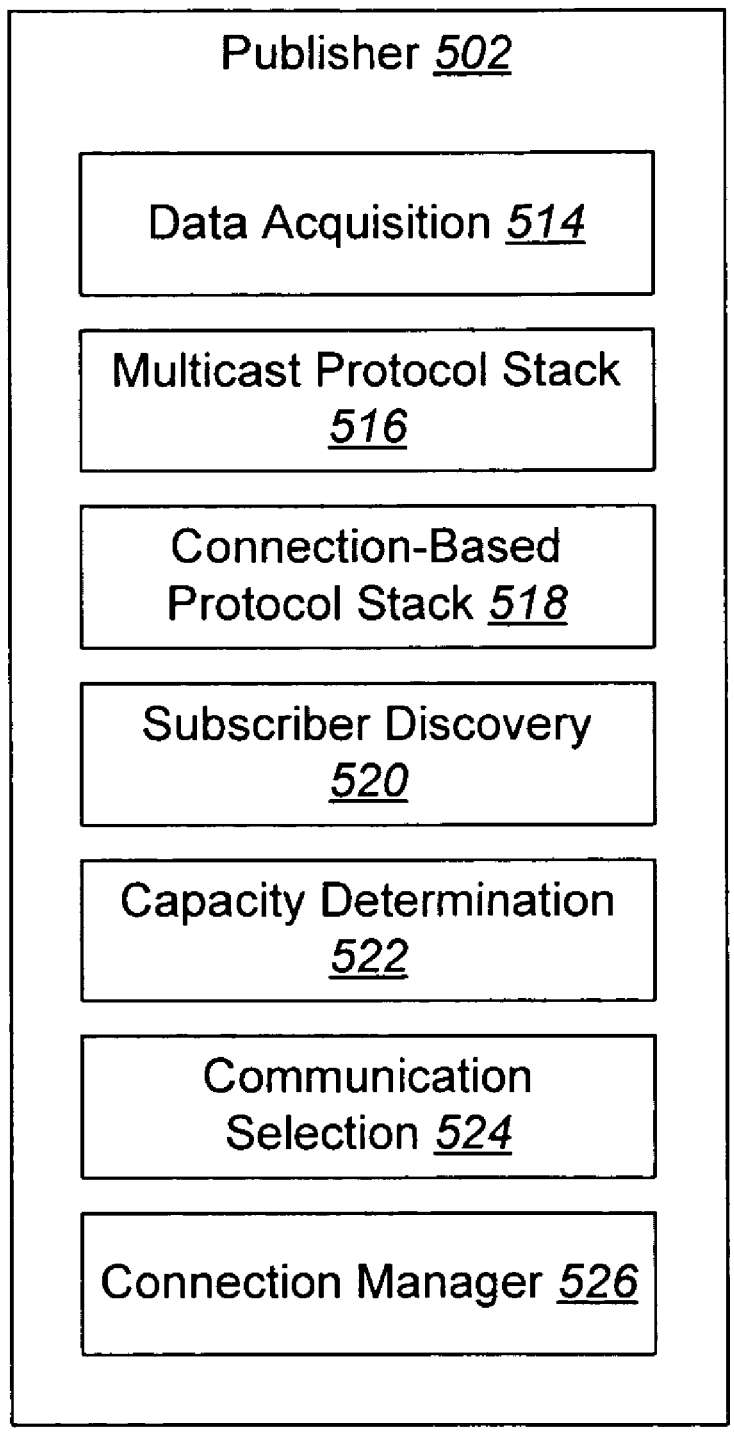
FIG. 5 is a block diagram that illustrates various functional components within a publisher according to an embodiment.

FIG. 5 is a block diagram that illustrates various functional components within a publisher 502 according to an embodiment. The publisher 502 includes a data acquisition module 514 that obtains data 106 about which other nodes in the network may be interested. Other nodes in the network may subscribe to receive notification messages 108 about the data 106 that is obtained by the data acquisition module 514.

The publisher 502 may also include a multicast protocol stack 516. The multicast protocol stack 516 may be configured to send messages (such as notification messages 108) to other nodes in the network via multicast.

The publisher 502 may also include a connection-based protocol stack 518. The connection-based protocol stack 518 may be configured to accept connections from or otherwise establish connections with other nodes in the network, and to send messages (such as notification messages 108) to other nodes in the network via a connection-based protocol. An example of a connection-based protocol stack 518 that may be used is the TCP/IP protocol stack.

The publisher 502 may also include a subscriber discovery module 520. The subscriber discovery module 520 may be configured to determine how many subscribers 104 there are in the network that are interested in receiving notification messages 108 about the data 106 that is obtained by the data acquisition module 514.

The publisher 502 may also include a capacity determination module 522. The capacity determination module 522 may be configured to determine the number of connections that the publisher 502 is capable of supporting.

The publisher 502 may also include a communication selection module 524. The communication selection module 524 may be configured to select the mechanism by which notification messages 108 are sent to subscribers 104 in the network (i.e., either via multicast or via a connection-based protocol). The connection manager 526 may operate as shown in FIG. 2 above and discussed in connection therewith.

The publisher 502 may also include a connection manager 526. The connection manager 526 may be configured to determine whether to accept connection requests from subscribers 104. The connection manager 526 may operate as shown in FIG. 4 and discussed in connection therewith.

FIG. 6 is a block diagram that illustrates various functional components within a subscriber 604 according to an embodiment. The subscriber 604 may include a multicast protocol stack 616. The multicast protocol stack 616 may be configured to receive messages (such as notification messages 108) from other nodes in the network (such as publishers 102) via multicast.

The subscriber 604 may also include a connection-based protocol stack 618. The connection-based protocol stack 618 may be configured to accept connections from or otherwise establish connections with other nodes in the network, and to receive messages (such as notification messages 108) from other nodes in the network (such as publishers 102) via a connection-based protocol. An example of a connection-based protocol stack 618 that may be used is the TCP/IP protocol stack.

The subscriber 604 also includes a quality of service (QOS) evaluation module 628. If the subscriber 604 starts receiving notification messages 108 from a publisher 102 via multicast, then the QOS evaluation module 628 determines whether multicast provides sufficient quality of service for the subscriber 604. The QOS evaluation module 628 may operate as shown in FIG. 3 and described in connection therewith.

Figure 7:
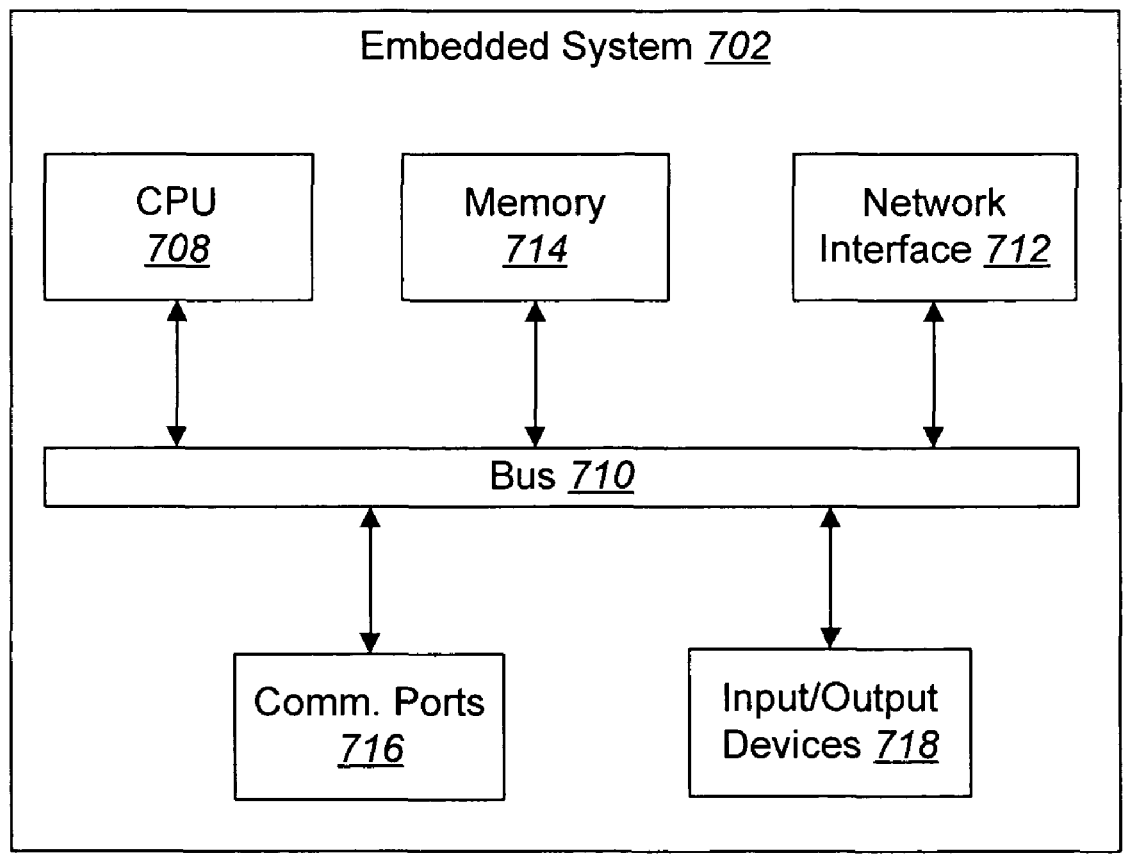
FIG. 7 is a block diagram of hardware components that may be used in an embedded system that is configured according to an embodiment.

A publisher node 102 may be an embedded system. Also, some or all of the subscriber nodes 104 may be embedded systems. FIG. 7 is a block diagram of hardware components that may be used in an embedded system 702 that is configured according to an embodiment. A central processing unit (CPU) 708 or processor may be provided to control the operation of the embedded system 702, including the other components thereof, which are coupled to the CPU 708 via a bus 710. The CPU 708 may be embodied as a microprocessor, microcontroller, digital signal processor or other device known in the art. The CPU 708 performs logical and arithmetic operations based on program code stored within the memory. In certain embodiments, the memory 714 may be on-board memory included with the CPU 708. For example, microcontrollers often include a certain amount of on-board memory.

The embedded system 702 may also include a network interface 712. The network interface 712 allows the embedded system 702 to be connected to a network, which may be a pager network, a cellular network, a global communications network, the Internet, a computer network, a telephone network, etc. The network interface 712 operates according to standard protocols for the applicable network.

The embedded system 702 may also include memory 714. The memory 714 may include random access memory (RAM) for storing temporary data. Alternatively, or in addition, the memory 714 may include read-only memory (ROM) for storing more permanent data, such as fixed code and configuration data. The memory 714 may also be embodied as a magnetic storage device, such as a hard disk drive. The memory 714 may be any type of electronic device that is capable of storing electronic information.

The embedded system 702 may also include one or more communication ports 716, which facilitate communication with other devices. The embedded system 702 may also include input/output devices 718, such as a keyboard, a mouse, a joystick, a touchscreen, a monitor, speakers, a printer, etc.

Of course, FIG. 7 illustrates only one possible configuration of an embedded system 702. Various other architectures and components may be utilized.

Figure 8:
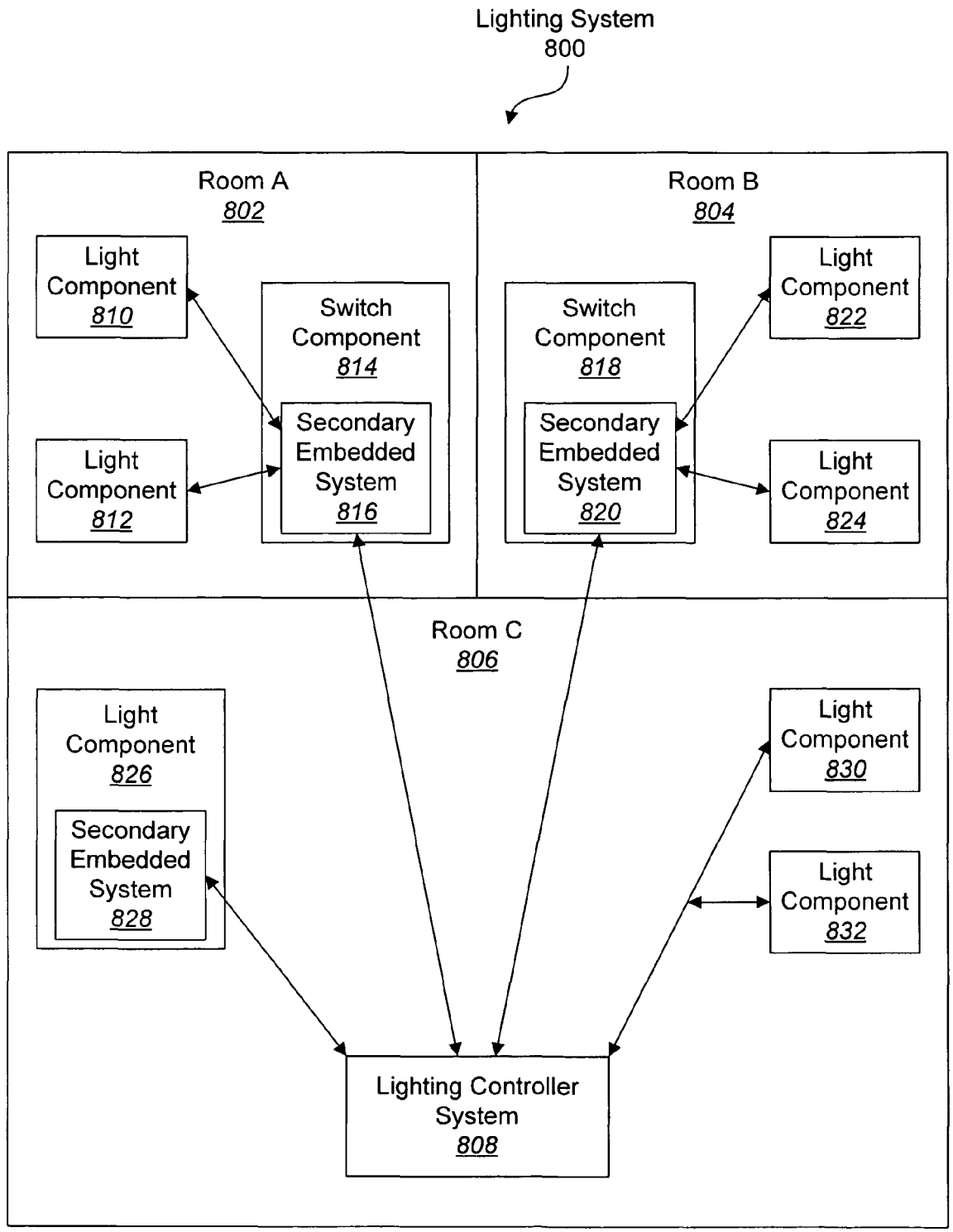
FIG. 8 illustrates an exemplary lighting system in which the present systems and methods may be implemented.

The present systems and methods may be used in several contexts. FIG. 8 illustrates one embodiment of a system wherein the present systems and methods may be implemented. FIG. 8 is a block diagram that illustrates one embodiment of a lighting system 800 that includes a lighting controller system 808. The lighting system 800 of FIG. 8 may be incorporated in various rooms in a home. As illustrated, the system 800 includes a room A 802, a room B 804, and a room C 806. Although three rooms are shown in FIG. 8, the system 800 may be implemented in any number and variety of rooms within a home, dwelling, or other environment.

The lighting controller system 808 may monitor and control additional embedded systems and components within the system 800. In one embodiment, the room A 802 and the room B 804 each include a switch component 814, 818. The switch components 814, 818 may also include a secondary embedded system 816, 820. The secondary embedded systems 816, 820 may receive instructions from the lighting controller system 808. The secondary embedded systems 816, 820 may then execute these instructions. The instructions may include powering on or powering off various light components 810, 812, 822, and 824. The instructions may also include dimming the brightness or increasing the brightness of the various light components 810, 812, 822, and 824. The instructions may further include arranging the brightness of the light components 810, 812, 822, and 824 in various patterns. The secondary embedded systems 816, 820 facilitate the lighting controller system 808 to monitor and control each light component 810, 812, 822, and 824 located in the room A 802 and the room B 804.

The lighting controller system 808 might also provide instructions directly to a light component 826 that includes a secondary embedded system 828 in the depicted room C 806. The lighting controller system 808 may instruct the secondary embedded system 828 to power down or power up the individual light component 826. Similarly, the instructions received from the lighting controller system 808 may include dimming the brightness or increasing the brightness of the individual light component 826.

The lighting controller system 808 may also monitor and provide instructions directly to individual light components 830 and 832 within the system 800. These instructions may include similar instructions as described previously.

Figure 9:
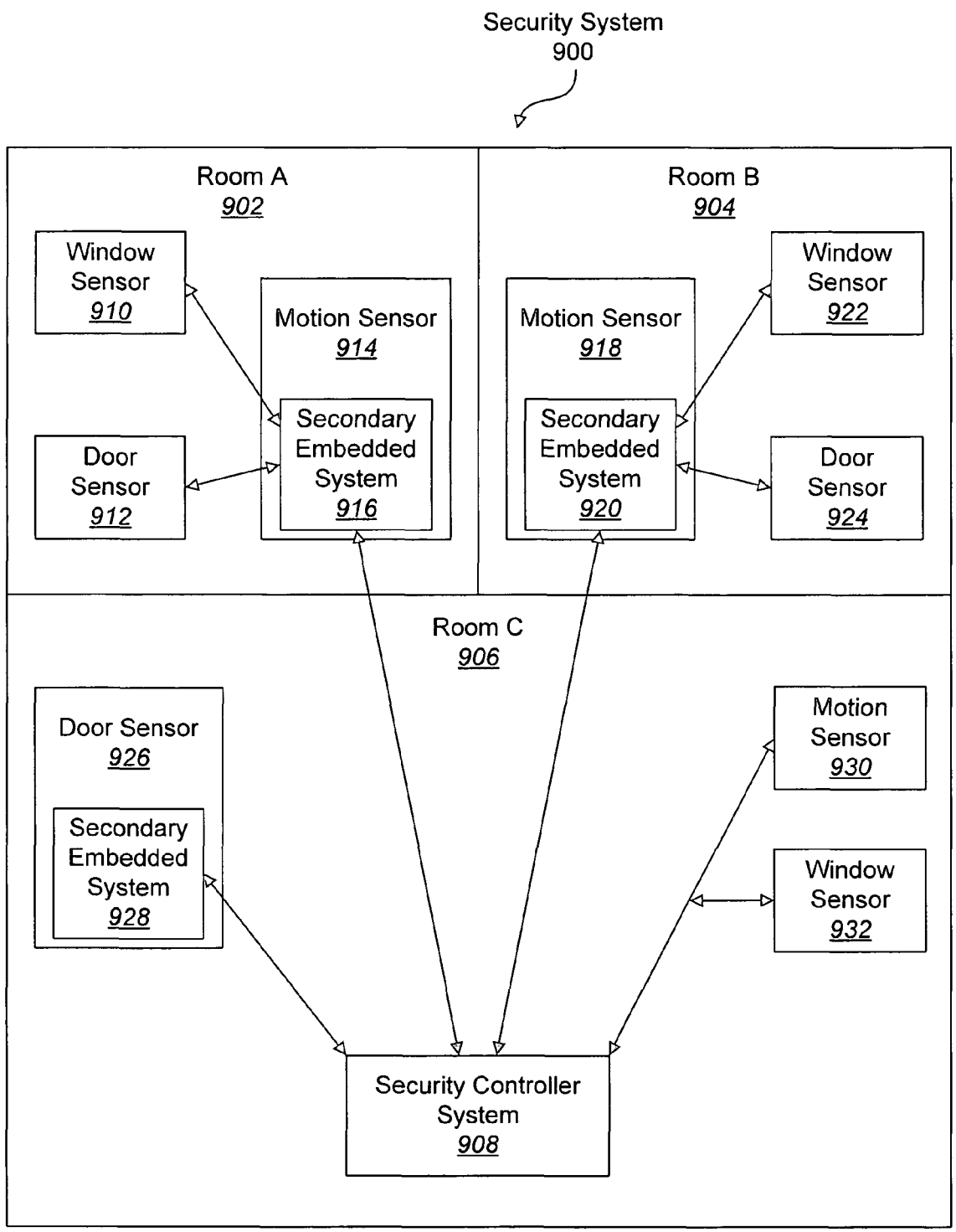
FIG. 9 illustrates an exemplary security system in which the present systems and methods may be implemented.

FIG. 9 is an additional embodiment of a system wherein the present systems and methods of the present invention may be implemented. FIG. 9 is a block diagram illustrating a security system 900. The security system 900 in the depicted embodiment is implemented in a room A 902, a room B 904, and a room C 906. These rooms may be in the confines of a home or other enclosed environment. The system 900 may also be implemented in an open environment where the rooms A, B and C, 902, 904, and 906 respectively represent territories or boundaries.

The system 900 includes a security controller system 908. The security controller system 908 monitors and receives information from the various components within the system 900. For example, a motion sensor 914, 918 may include a secondary embedded system 916. The motion sensors 914, 918 may monitor an immediate space for motion and alert the security controller system 908 when motion is detected via the secondary embedded system 916, 920. The security controller system 908 may also provide instructions to the various components within the system 900. For example, the security controller system 908 may provide instructions to the secondary embedded systems 916, 920 to power up or power down a window sensor 910, 922 and a door sensor 912, 924. In one embodiment, the secondary embedded systems 916, 920 notify the security controller system 908 when the window sensors 910, 922 detect movement of a window. Similarly, the secondary embedded systems 916, 920 notify the security controller system 908 when the door sensors 912, 924 detect movement of a door. The secondary embedded systems 916, 920 may instruct the motion sensors 914, 918 to activate the LED (not shown) located within the motion sensors 914, 918.

The security controller system 908 may also monitor and provide instructions directly to individual components within the system 900. For example, the security controller system 908 may monitor and provide instructions to power up or power down to a motion sensor 930 or a window sensor 932. The security controller system 908 may also instruct the motion sensor 930 and the window sensor 932 to activate the LED (not shown) or audio alert notifications within the sensors 930 and 932.

Each individual component comprising the system 900 may also include a secondary embedded system. For example, FIG. 9 illustrates a door sensor 926 including a secondary embedded system 928. The security controller system 908 may monitor and provide instructions to the secondary embedded system 928 in a similar manner as previously described.

Figure 10:
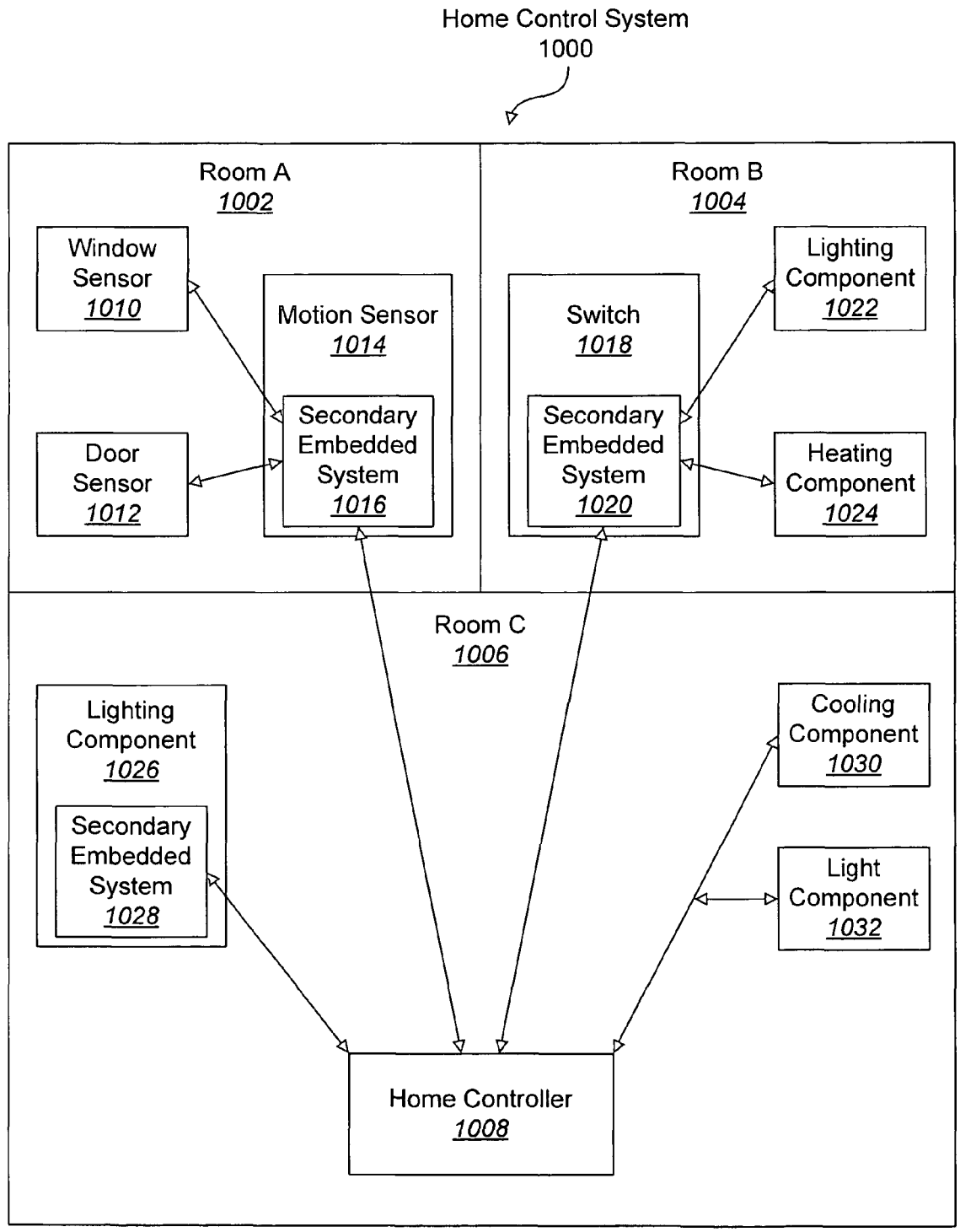
FIG. 10 illustrates an exemplary home controller system in which the present systems and methods may be implemented.

FIG. 10 is a block diagram illustrating one embodiment of a home control system 1000. The home control system 1000 includes a home controller 1008 that facilitates the monitoring of various systems such as the lighting system 800, the security system 900, and the like. The home control system 1000 allows a user to control various components and systems through one or more embedded systems. In one embodiment, the home controller system 1008 monitors and provides information in the same manner as previously described in relation to FIGS. 8 and 9. In the depicted embodiment, the home controller 1008 provides instructions to a heating component 1024 via a secondary embedded system 1020. The heating component 1024 may include a furnace or other heating device typically found in resident locations or offices. The home controller system 1008 may provide instructions to power up or power down the heating component 1024 via the secondary embedded system 1020.

Similarly, the home controller 1008 may monitor and provide instructions directly to a component within the home control system 1000 such as a cooling component 1030. The cooling component 1030 may include an air conditioner or other cooling device typically found in resident locations or offices. The central home controller 1008 may instruct the cooling component 1030 to power up or power down depending on the temperature reading collected by the central embedded system 1008. The home control system 1000 functions in a similar manner as previously described in relation to FIGS. 8 and 9.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for selecting an appropriate transport mechanism for communication in a network, the method being implemented by a publisher node in the network, the method comprising:
    determining, by the publisher node, how many subscriber nodes in the network have subscribed to receive notification messages about data that is maintained by the publisher node;
    determining, by the publisher node, how many available connections the publisher node is configured to support;
    obtaining, by the publisher node, quality of service requirements from a plurality of the subscriber nodes indicating how important it is for the subscriber node to receive each notification message;
    sending the notification messages to the subscriber nodes via a connection-based protocol when the number of available connections exceeds the number of subscriber nodes;
    sending the notification messages to the subscriber nodes via multicast when the number of subscriber nodes exceeds the number of available connections;
    sending the notification messages to a subset of the subscriber nodes via a connection-based protocol when the notification messages are sent to the subscriber nodes via multicast;
    receiving a connection request from a requesting subscriber node when the publisher node sends the notification messages to the subscriber nodes via multicast; and
    determining whether to accept the connection request.

2. The method of claim 1, further comprising receiving at least one connection request from at least one requesting subscriber node when the publisher node sends the notification messages to the subscriber nodes via multicast.

3. The method of claim 1, wherein determining whether to accept the connection request comprises:
    determining whether the publisher node is configured to support at least one additional connection; and
    accepting the connection request when the publisher node is configured to support at least one additional connection.

4. The method of claim 3, wherein when the publisher node is not configured to support at least one additional connection, determining whether to accept the connection request comprises determining whether the requesting subscriber node's quality of service requirement is greater than at least one presently connected subscriber node's quality of service requirement.

5. The method of claim 4, further comprising, when the requesting subscriber node's quality of service requirement is greater than at least one presently connected subscriber node's quality of service requirement:
    terminating a current connection of a subscriber node that has a lower quality of service requirement than the requesting subscriber node; and
    opening a connection to the requesting subscriber node.

6. The method of claim 5, further comprising determining whether a connection already exists for the node that sent the connection request.

7. The method as in claim 6, wherein the notification messages about data that is maintained by the publisher node comprises temperature data.

8. The method as in claim 6, wherein the notification messages about data that is maintained by the publisher node comprises data about whether a door is open or closed.

9. The method of claim 1, further comprising switching from sending the notification messages via the connection-based protocol to sending the notification messages via multicast when the number of subscriber nodes that request connections to the publisher node exceeds the number of available connections.

10. The method of claim 1, wherein the network is a peer-to-peer network.

11. The method of claim 1, wherein the connection-based protocol is TCP/IP.

12. The method of claim 1, wherein the publisher node is an embedded system.

13. A publisher node that is configured for selecting an appropriate transport mechanism for communication in a network, the publisher node comprising:
    a processor;
    memory in electronic communication with the processor;
    instructions stored in the memory, the instructions being executable to:
        determine, by the publisher node, how many subscriber nodes in the network have subscribed to receive notification messages about data that is maintained by the publisher node;
        determine, by the publisher node, how many available connections the publisher node is configured to support;

obtain, by the publisher node, quality of service requirements from a plurality of the subscriber nodes indicating how important it is for the subscriber node to receive each notification message;

send the notification messages to the subscriber nodes via a connection-based protocol when the number of available connections exceeds the number of subscriber nodes;

send the notification messages to the subscriber nodes via multicast when the number of subscriber nodes exceeds the number of available connections;

send the notification messages to a subset of the subscriber nodes via a connection-based protocol when the notification messages are sent to the subscriber nodes via multicast, receive a connection request from a requesting subscriber node when the publisher node sends the notification messages to the subscriber nodes via multicast; and determine whether to accept the connection request.

14. The publisher node of claim 13, wherein the instructions are further executable to receive at least one connection request from at least one requesting subscriber node when the publisher node sends the notification messages to the subscriber nodes via multicast.

15. The publisher node of claim 13, wherein the instructions executable to determine whether to accept the connection request comprise instructions executable to:

determine whether the publisher node is configured to support at least one additional connection; and accept the connection request when the publisher node is configured to support at least one additional connection.

16. The publisher node of claim 15, wherein when the publisher node is not configured to support at least one additional connection, the instructions executable to determine whether to accept the connection request comprise instructions executable to determine whether the requesting subscriber node's quality of service requirement is greater than at least one presently connected subscriber node's quality of service requirement.

17. A non-transitory computer storage medium comprising executable instructions for selecting an appropriate transport mechanism for communication in a network, the instructions being executed by a publisher node in the network, the instructions being executable to:

determine, by the publisher node, how many subscriber nodes in the network have subscribed to receive notification messages about data that is maintained by the publisher node;

determine, by the publisher node, how many available connections the publisher node is configured to support;

obtain, by the publisher node, quality of service requirements from a plurality of the subscriber nodes indicating how important it is for the subscriber node to receive each notification message;

send the notification messages to the subscriber nodes via a connection-based protocol when the number of available connections exceeds the number of subscriber nodes;

send the notification messages to the subscriber nodes via multicast when the number of subscriber nodes exceeds the number of available connections;

send the notification messages to a subset of the subscriber nodes via a connection-based protocol when the notification messages are sent to the subscriber nodes via multicast;

receive a connection request from a requesting subscriber node when the publisher node sends the notification messages to the subscriber nodes via multicast; and determine whether to accept the connection request.

18. The non-transitory computer storage medium of claim 17, wherein the instructions are further executable to receive at least one connection request from at least one requesting subscriber node when the publisher node sends the notification messages to the subscriber nodes via multicast.

19. The non-transitory computer storage medium of claim 17, wherein instructions executable to determine whether to accept the connection request comprise instructions executable to:

determine whether the publisher node is configured to support at least one additional connection; and accept the connection request when the publisher node is configured to support at least one additional connection.

20. The non-transitory computer storage medium of claim 19, wherein when the publisher node is not configured to support at least one additional connection, the instructions executable to determine whether to accept the connection request comprise instructions executable to determine whether the requesting subscriber node's quality of service requirement is greater than at least one presently connected subscriber node's quality of service requirement.

* * * * *